US011237330B2

(12) United States Patent
Sato

(10) Patent No.: US 11,237,330 B2
(45) Date of Patent: Feb. 1, 2022

(54) OPTICAL FIBER ALIGNMENT JIG, OPTICAL FIBER FUSION SPLICER EQUIPPED WITH OPTICAL FIBER ALIGNMENT JIG, AND METHOD FOR ALIGNING OPTICAL FIBER

(71) Applicant: SUMITOMO ELECTRIC OPTIFRONTIER CO., LTD., Yokohama (JP)

(72) Inventor: Ryuichiro Sato, Yokohama (JP)

(73) Assignee: SUMITOMO ELECTRIC OPTIFRONTIER CO., LTD., Yokohama (JP)

( * ) Notice: Subject to any disclaimer, the term of this patent is extended or adjusted under 35 U.S.C. 154(b) by 0 days.

(21) Appl. No.: 17/272,518

(22) PCT Filed: Jun. 18, 2019

(86) PCT No.: PCT/JP2019/024035
§ 371 (c)(1),
(2) Date: Mar. 1, 2021

(87) PCT Pub. No.: WO2020/044738
PCT Pub. Date: Mar. 5, 2020

(65) Prior Publication Data
US 2021/0318492 A1 Oct. 14, 2021

(30) Foreign Application Priority Data

Aug. 29, 2018 (JP) .............................. JP2018-160171

(51) Int. Cl.
*G02B 6/25* (2006.01)
*G02B 6/255* (2006.01)
*G02B 6/44* (2006.01)

(52) U.S. Cl.
CPC ......... *G02B 6/2556* (2013.01); *G02B 6/2553* (2013.01); *G02B 6/4403* (2013.01); *G02B 6/4408* (2013.01)

(58) Field of Classification Search
CPC .. G02B 6/2556; G02B 6/2553; G02B 6/4403; G02B 6/4408
(Continued)

(56) References Cited

U.S. PATENT DOCUMENTS 4,415,347 A 11/1983 Malinge et al.
10,107,964 B1 10/2018 Zhao

FOREIGN PATENT DOCUMENTS

CN 107703586 A 2/2018
JP H04-221908 A 8/1992
(Continued)

Primary Examiner — Jerry M Blevins
(74) Attorney, Agent, or Firm — Oliff PLC

(57) ABSTRACT

This optical fiber alignment jig for aligning a plurality of optical fibers with the tip end coating stripped off to expose glass fiber includes a rail; a convex push-up part capable of moving in the extending direction of the rail; and a plurality of plate-shaped parts that each have a first surface and a second surface perpendicular to the extending direction of the rail and an inclined surface that can carry a respective optical fiber, the inclined surfaces of the plurality of plate-shaped parts being inclined, relative to the extending direction of the rail, in the same direction. The plurality of plate-shaped parts are arranged side by side along the extending direction of the rail with the first surface of one plate-shaped part facing the second surface of an adjacent plate-shaped part and are contacted by the push-up part so as to move toward the inclined surface side.

11 Claims, 10 Drawing Sheets

(58) Field of Classification Search
USPC .......................................................... 385/96
See application file for complete search history.

(56) References Cited

FOREIGN PATENT DOCUMENTS

| JP | 05093815 A | * | 4/1993 | ............. G02B 6/255 |
|----|------------|---|--------|--------------------------|
| JP | H05-093815 A | | 4/1993 | |
| JP | H07-218753 A | | 8/1995 | |
| JP | 2005-258129 A | | 9/2005 | |
| JP | 2007-041380 A | | 2/2007 | |

* cited by examiner

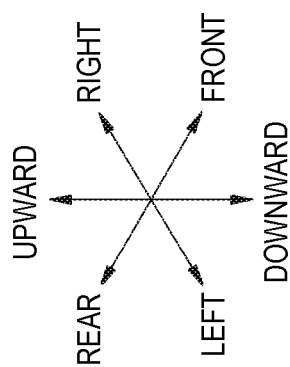
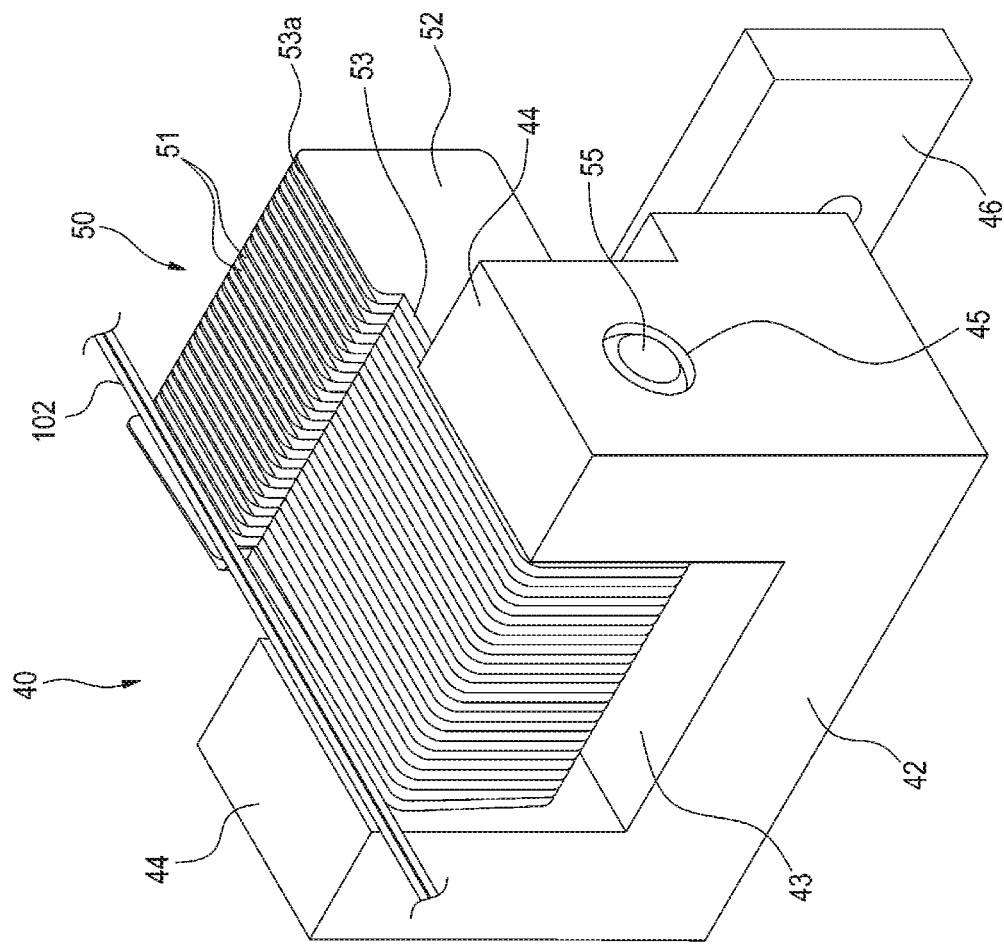
FIG. 3

OPTICAL FIBER ALIGNMENT JIG, OPTICAL FIBER FUSION SPLICER EQUIPPED WITH OPTICAL FIBER ALIGNMENT JIG, AND METHOD FOR ALIGNING OPTICAL FIBER

TECHNICAL FIELD

The present invention relates to an optical fiber alignment jig, an optical fiber fusion splicer equipped with an optical fiber alignment jig, and a method for aligning optical fibers.

The present application claims priority from Japanese Patent Application No. 2018-160171, filed on Aug. 29, 2018, the entire subject content of which is incorporated herein by reference.

BACKGROUND ART

Patent Literature 1 discloses an optical fiber holder including a holder body provided with a groove for gripping an optical fiber and a lid body attached to a groove forming surface side of the holder body so as to be freely opened and closed. The holder body is formed with a first arrangement groove for aligning a plurality of optical fibers, a plurality of positioning grooves for converting an arrangement pitch of the plurality of optical fibers, and a second arrangement groove for aligning a plurality of optical fibers in a longitudinal direction of the positioning grooves and having a width narrower than that of the first arrangement groove.

Patent Literature 2 discloses an optical fiber holder including a wide groove that accommodates a plurality of large-diameter single optical fibers with a large diameter obtained by overlaying a coating layer on a single optical fiber arranged side by side, and a narrow groove that accommodates a plurality of single optical fibers arranged side by side. In the optical fiber holder, a pitch matching groove is provided between the wide groove and the narrow groove, and the pitch matching groove guides each single optical fiber obtained by peeling off the coating layer from respective large-diameter single optical fibers and leads the single optical fiber to the narrow groove such that an inter-fiber pitch is narrowed.

Patent Literature 3 discloses an optical fiber fusion splicer including a V-groove for axis alignment of ribbon fiber, and a holder provided behind the V-groove and having a base and a lid that can be opened and closed with respect to the base. On an upper surface of the base, a pitch adjusting unit capable of arranging coated optical fibers of the ribbon fiber at substantially the same pitch as the V-groove is provided.

CITATION LIST

Patent Literature

Patent Literature 1: JP-A-2005-258129
Patent Literature 2: JP-A-2007-041380
Patent Literature 3: JP-A-H07-218753

SUMMARY OF INVENTION

Solution to Problem

In order to achieve the object of the present disclosure, an optical fiber alignment jig according to the present disclosure is configured as follows:

An optical fiber alignment jig for aligning a plurality of optical fibers ip end coating of which is stripped off to expose glass fibers, the optical fiber alignment jig including:

a rail;

a convex push-up portion movable along an extending direction of the rail; and a plurality of plate-shaped members each having a first surface and a second surface which are perpendicular to the extending direction of the rail, and an inclined surface on which one of the plurality of optical fibers is placeable, the inclined surfaces of the plurality of plate-shaped members being inclined in the same direction with respect to the extending direction, the plurality of plate-shaped members being arranged in parallel along the extending direction such that a first surface of one plate-shaped member among the plurality of plate-shaped members faces a second surface of an adjacent plate-shaped member, and configured to move toward an inclined surface side when come into contact with the push-up portion.

BRIEF DESCRIPTION OF DRAWINGS

FIG. 3 is a perspective view showing an optical fiber alignment jig included in the fusion processing unit of FIG. 2.

DESCRIPTION OF EMBODIMENTS

Technical Problem

Figure 1:
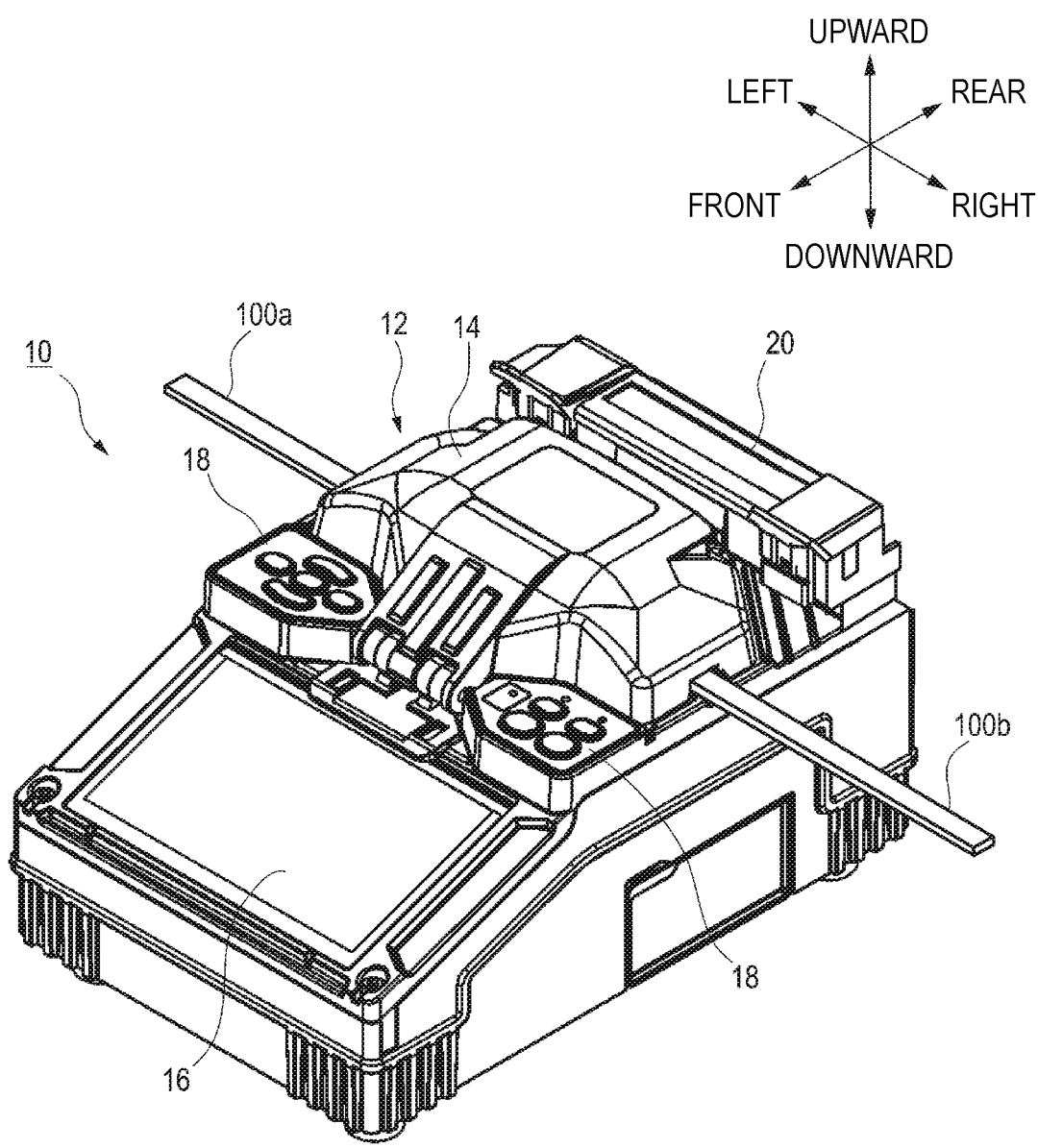
FIG. 1 is a perspective view showing an example of an optical fiber fusion splicer according to the present embodiment.

In the optical fiber holder disclosed in Patent Literature 1 or Patent Literature 2 described above, a width of a space in which a plurality of optical fibers are aligned is narrowed or widened so that the single optical fibers are arranged side by side at a desired pitch and fusion-spliced. However, the optical fibers may not be properly aligned due to the influence of bending deformation remaining on the individual optical fibers. For this reason, the optical fibers may be aligned and the coating may be removed again.

Therefore, an object of the present disclosure is to provide an optical fiber alignment jig capable of appropriately aligning optical fibers, an optical fiber fusion splicer equipped with the optical fiber alignment jig, and a method for aligning optical fibers.

Advantageous Effects of Invention

According to the present disclosure, a plurality of optical fibers may be appropriately aligned.

DESCRIPTION OF EMBODIMENTS OF DISCLOSURE

First, the content of an embodiment of the present disclosure will be listed and described.

The optical fiber alignment jig according to the embodiment of the present disclosure is configured as follows.

(1) An optical fiber alignment jig for aligning a plurality of optical fibers tip end coating of which is stripped off to expose glass fibers, the optical fiber alignment jig includes:
a rail;
a convex push-up portion movable along an extending direction of the rail; and
a plurality of plate-shaped members each having a first surface and a second surface which are perpendicular to the extending direction of the rail, and an inclined surface on which one of the plurality of optical fibers is placeable, the inclined surfaces of the plurality of plate-shaped members being inclined in the same direction with respect to the extending direction, the plurality of plate-shaped members being arranged in parallel along the extending direction such that a first surface of one plate-shaped member among the plurality of plate-shaped members faces a second surface of an adjacent plate-shaped member, and configured to move toward an inclined surface side when come into contact with the push-up portion.

According to the configuration, the plurality of plate-shaped members come into contact with the push-up portion, so that each of the plurality of plate-shaped members is shifted and moved to the inclined surface side in order together with the front and rear plate-shaped members, and the plurality of optical fibers are respectively placed on the inclined surfaces formed on the plate-shaped members in order. As a result, the optical fibers can be corrected one by one, and the plurality of optical fibers can be appropriately aligned.

(2) The plurality of plate-shaped members may be individually rotated, in response to contact with the push-up portion, around a shaft extending along the extending direction.

According to the configuration, a plurality of optical fibers can be corrected one by one with a simple configuration in which a plurality of plate-shaped members are rotated in order.

(3) The plurality of plate-shaped members may be configured to have the same shape as each other.

According to the configuration, the optical fiber alignment jig can be easily produced.

(4) The number of the plurality of plate-shaped members may be larger than the number of the plurality of optical fibers.

According to the configuration, a case where a part of the plurality of optical fibers comes off from the plurality of plate-shaped members can be prevented, and the plurality of optical fibers can be reliably aligned.

(5) A parallel pitch of the plurality of plate-shaped members in the extending direction may be equal to an alignment pitch of the plurality of optical fibers.

According to the configuration, the plurality of optical fibers can be aligned at a desired pitch, and each optical fiber can be reliably accommodated in each V-groove formed in the fusion-spliced portion.

(6) The parallel pitch of the plurality of plate-shaped members may be 60 μm or more and 300 μm or less.

In order to appropriately align the plurality of optical fibers, the parallel pitch of the plurality of plate-shaped members is preferably within the above range.

(7) The push-up portion may include:
a top portion parallel to an axial direction of the plurality of optical fibers; and
two slopes having different slope directions with respect to the extending direction.

According to the configuration, the push-up portion is formed as a mountainous protruding portion, so that each of the plurality of plate-shaped members is shifted and moved in order together with the front and rear plate-shaped members by contacting the top of the push-up portion with each plate-shaped member.

(8) An angle formed by the two slopes may be 60 degrees or more and 170 degrees or less.

The angle formed by the two slopes of the convex portion is preferably within the above range.

(9) An optical fiber fusion splicer according to the embodiment of the present disclosure, includes:
a holder placing portion on which an optical fiber holder that holds the plurality of optical fibers by sandwiching the plurality of optical fibers along an axial direction is placed;
a V-groove on which the glass fibers are individually placeable;
another V-groove on which other glass fibers different from the plurality of optical fibers are placeable; and
a pair of discharge electrodes facing each other,
wherein the other V-groove, the V-groove, the optical fiber alignment jig, and the holder placing portion are located in this order along a direction intersecting the extending direction of the rail, and
the pair of discharge electrodes are configured to discharge between the V-groove and the other V-groove.

According to the configuration, it is possible to provide an optical fiber fusion splicer including an optical fiber alignment jig capable of appropriately aligning a plurality of optical fibers.

(10) The plurality of plate-shaped members may be individually rotated, in response to contact with the push-up portion, around a shaft extending along the extending direction of the rail, and
the rotation shaft of the plurality of plate-shaped members is located closer to the optical fiber holder than the V-groove.

According to the configuration, the plurality of optical fibers can be aligned on the side close to the V-groove, and each optical fiber can be appropriately held in the V-groove.

(11) A method for aligning optical fibers according to the embodiment of the present disclosure is
a method for aligning optical fibers using the optical fiber alignment jig described in any one of aspects (1) to (8), the method including:
moving the push-up portion along the rail;
bringing the push-up portion into contact with the plurality of plate-shaped members in order;
in response to contact with the push-up portion, moving at least one of the plurality of plate-shaped members toward the inclined surface side; and
placing the plurality of optical fibers on the inclined surfaces of the plurality of plate-shaped members, respectively.

According to the configuration, it is possible to provide a method for aligning optical fibers capable of appropriately aligning a plurality of optical fibers.

DETAILS OF EMBODIMENTS OF DISCLOSURE

Hereinafter, an example of an embodiment of a reinforcing device for an optical fiber fusion-spliced portion and a fusion splicer including the same according to the present disclosure will be described with reference to the drawings.

First, a fusion splicing process of the optical fiber by the optical fiber fusion splicer according to the present embodiment and a heat treatment of an optical fiber reinforcing member by a heat treatment device according to the present embodiment will be described with reference to FIGS. 1 and 2.

As shown in FIG. 1, a fusion splicer 10 is, for example, a device for fusion-splicing glass fibers exposed from optical fibers and further reinforcing the fusion-spliced portion at a site where an optical fiber facility is constructed. In the present embodiment, glass fibers of optical fiber ribbons 100a and 100b formed by collectively coating a plurality of optical fibers arranged in parallel are fusion-spliced. The fusion splicer 10 includes a fusion processing unit 12 that fusion-splices a plurality of glass fibers exposed from the optical fiber ribbons 100a, 100b, and a reinforcing device 20 that reinforces the fusion-spliced portion of the glass fibers.

The fusion processing unit 12 can be opened and closed by an opening and closing cover 14. In a state where the opening and closing cover 14 is open, end faces of the glass fibers of the optical fiber ribbons 100a, 100b extending from an optical fiber holder (see FIG. 2) mounted inside the opening and closing cover 14 are arranged at a fusion position. In the fusion processing unit 12, at the fusion position where a pair of electrodes (not shown) are arranged to face each other, the end faces of the glass fibers are fusion-spliced by the discharge of the pair of electrodes.

Further, the fusion splicer 10 is provided with a monitor 16 on a front side thereof. The monitor 16 displays, for example, an image of a fused portion of the glass fibers taken by a microscope equipped with an image sensor such as a Charge-Coupled Device (CCD). An operator can perform the fusion work while watching the image on the monitor 16. Further, the monitor 16 also serves as an operation unit for operating the fusion processing unit 12 and the reinforcing device 20. Various operations can be performed by the operator touching the monitor 16. Further, an operation unit 18 provided with a power switch and the like is provided above the monitor 16.

Figure 2:
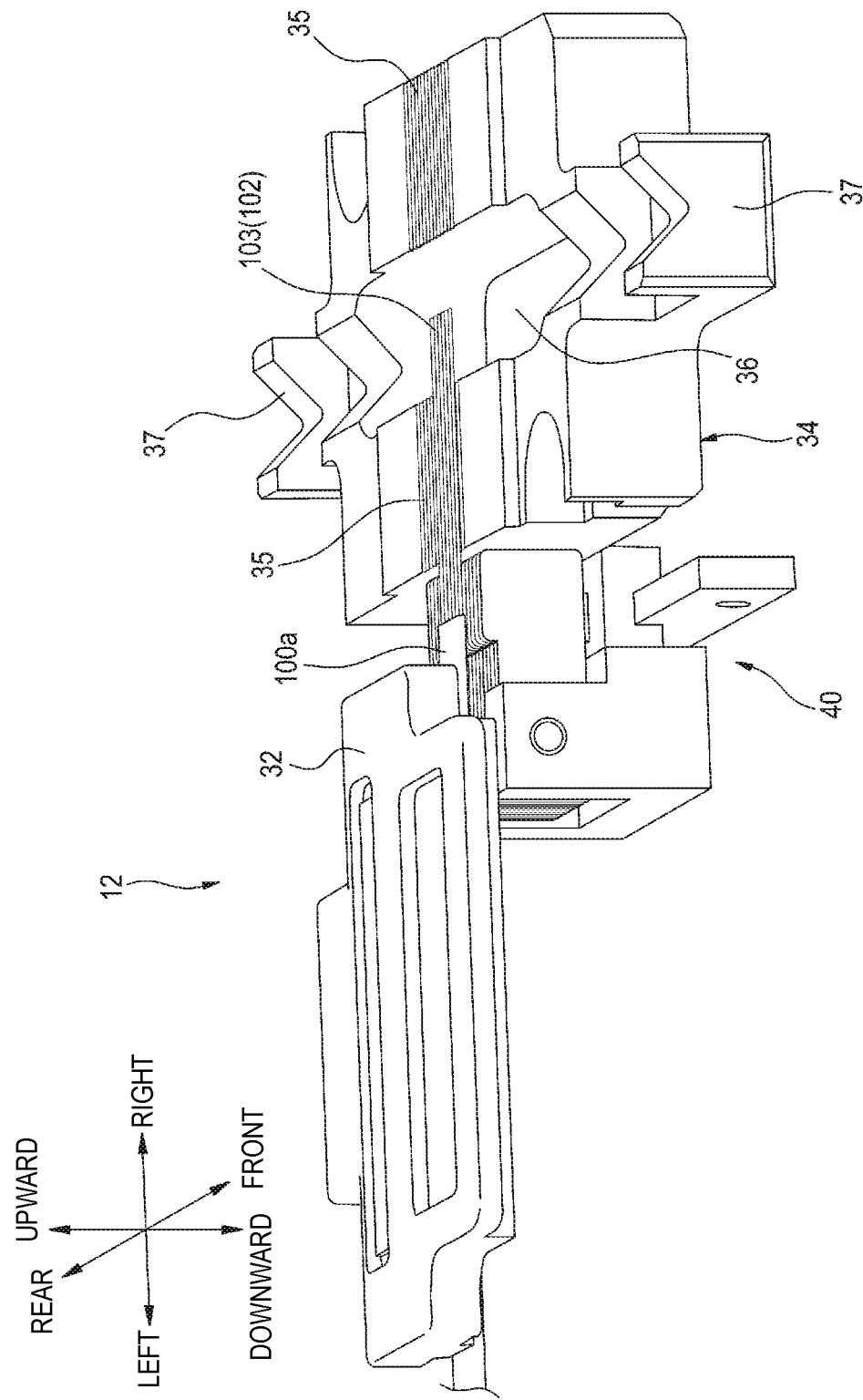
FIG. 2 is a perspective view showing a main part of a fusion processing unit included in the optical fiber fusion splicer of FIG. 1.

FIG. 2 shows a state in which one of the optical fiber ribbons is arranged in the fusion processing unit 12.

A pair of optical fiber holders 32 are detachably attached to the fusion processing unit 12. In FIG. 2, in order to clearly show the configuration of an optical fiber alignment jig 40 described later, only a lid portion of the optical fiber holder 32 that holds the optical fiber ribbon 100a is shown, and a main body portion of the optical fiber holder 32 and a holder mounting portion (an example of a holder placing portion on which the optical fiber holder 32 can be placed) to which the main body portion is attached are omitted. Further, in FIG. 2, of the pair of optical fiber holders 32, only the optical fiber holder 32 holding an end portion of the one optical fiber ribbon 100a is shown. By mounting the optical fiber holder 32 on the holder mounting portion (not shown), the optical fibers 102 exposed from the optical fiber ribbon 100a held by the optical fiber holder 32 is positioned at the fusion position.

The optical fibers 102 are led out and exposed from the end portion of the optical fiber ribbon 100a held by the optical fiber holder 32. Although not shown in FIG. 3 and the following figures, in the exposed optical fibers 102, the coating is removed at the end portion and the glass fibers 103 is exposed.

The fusion processing unit 12 further includes a V-groove member 34 for positioning tip end positions of the plurality of optical fibers 102 extending from the optical fiber ribbon 100a held in the optical fiber holder 32. An upper surface of the V-groove member 34 is provided with a pair of V-grooves 35 for positioning the glass fibers 103 of the optical fibers 102 exposed from the one optical fiber ribbon 100a and the glass fibers 103 of the optical fibers 102 exposed from the other optical fiber ribbon 100b respectively. The pair of V-grooves 35 can individually place the glass fibers 103 of the optical fibers 102. The pair of V-grooves 35 are sized such that the glass fibers 103 to be connected each other are supported and positioned in a straight line. A plurality of groove portions are formed in each V-groove 35 by alternately forming valleys and peaks. A parallel pitch of the V-groove 35 is, for example, 60 µm or more and 300 µm or less.

In the V-groove member 34, an opening portion 36 is formed between the pair of V-grooves 35. The V-groove member 34 is formed with a pair of electrode holding portions 37 so as to sandwich the opening portion 36 in a direction orthogonal to a direction in which the pair of V-grooves 35 are arranged in parallel (that is, an axial direction of the glass fibers 103 facing each other). An electrode (not shown) that discharges to fuse the end faces of the glass fibers 103 facing each other is arranged on the electrode holding portion 37. Then, when the operator operates the operation unit 18 to discharge the electrode, the glass fibers 103 positioned at the fusion position in the opening portion 36 are heat-fused and spliced with each other.

The optical fiber alignment jig 40 is provided between the optical fiber holder 32 attached to the fusion processing unit 12 and the V-groove member 34. In FIG. 2, only the optical fiber alignment jig 40 provided between the one optical fiber holder 32 and the one V-groove member 34 is shown, but in reality, the optical fiber alignment jig 40 is also provided between the other optical fiber holder 32 and the other V-groove member 34.

Figure 4:
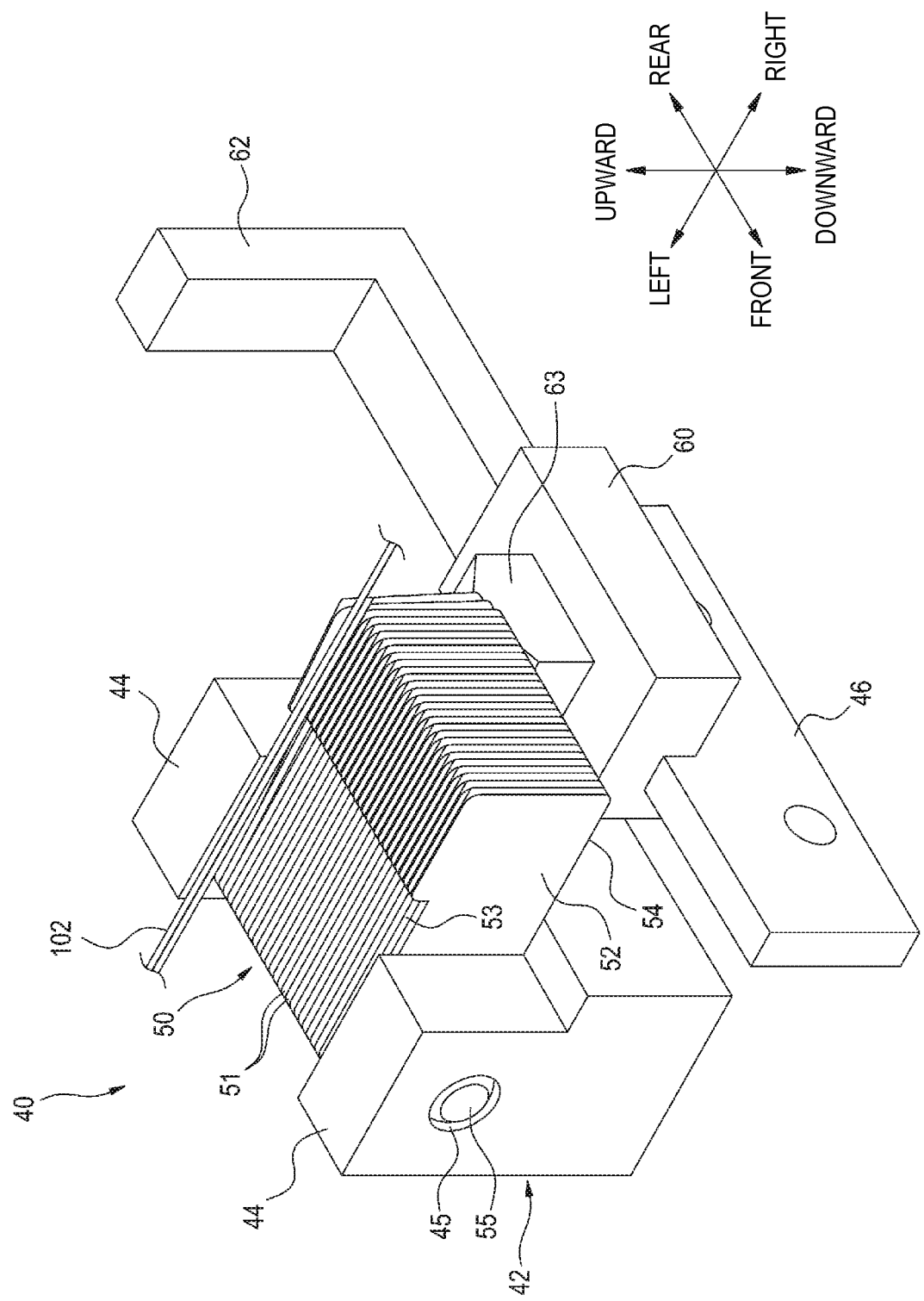
FIG. 4 is a perspective view showing the optical fiber alignment jig of FIG. 3 from another direction.
Figure 5:
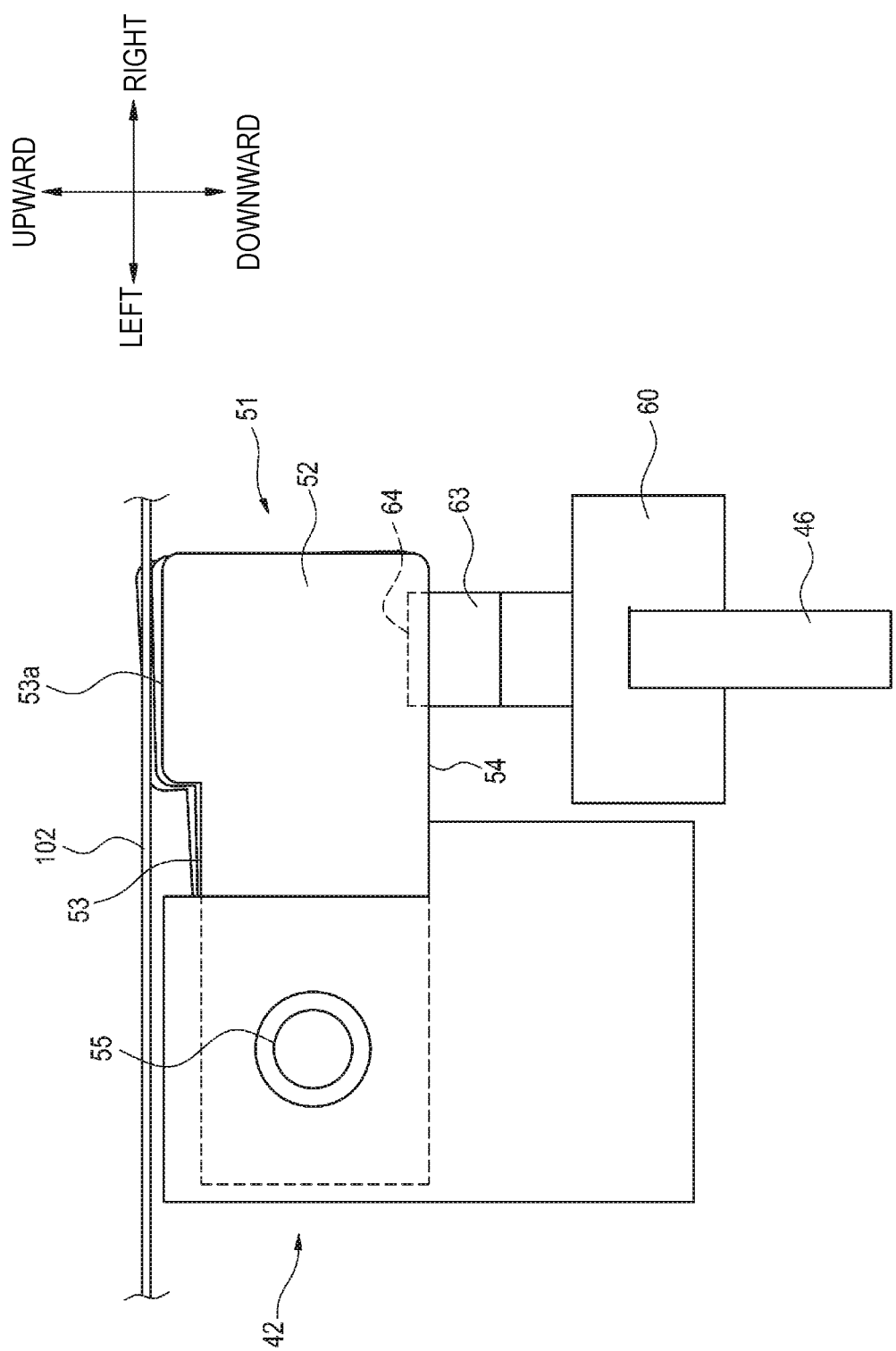
FIG. 5 is a front view of the optical fiber alignment jig.
Figure 6:
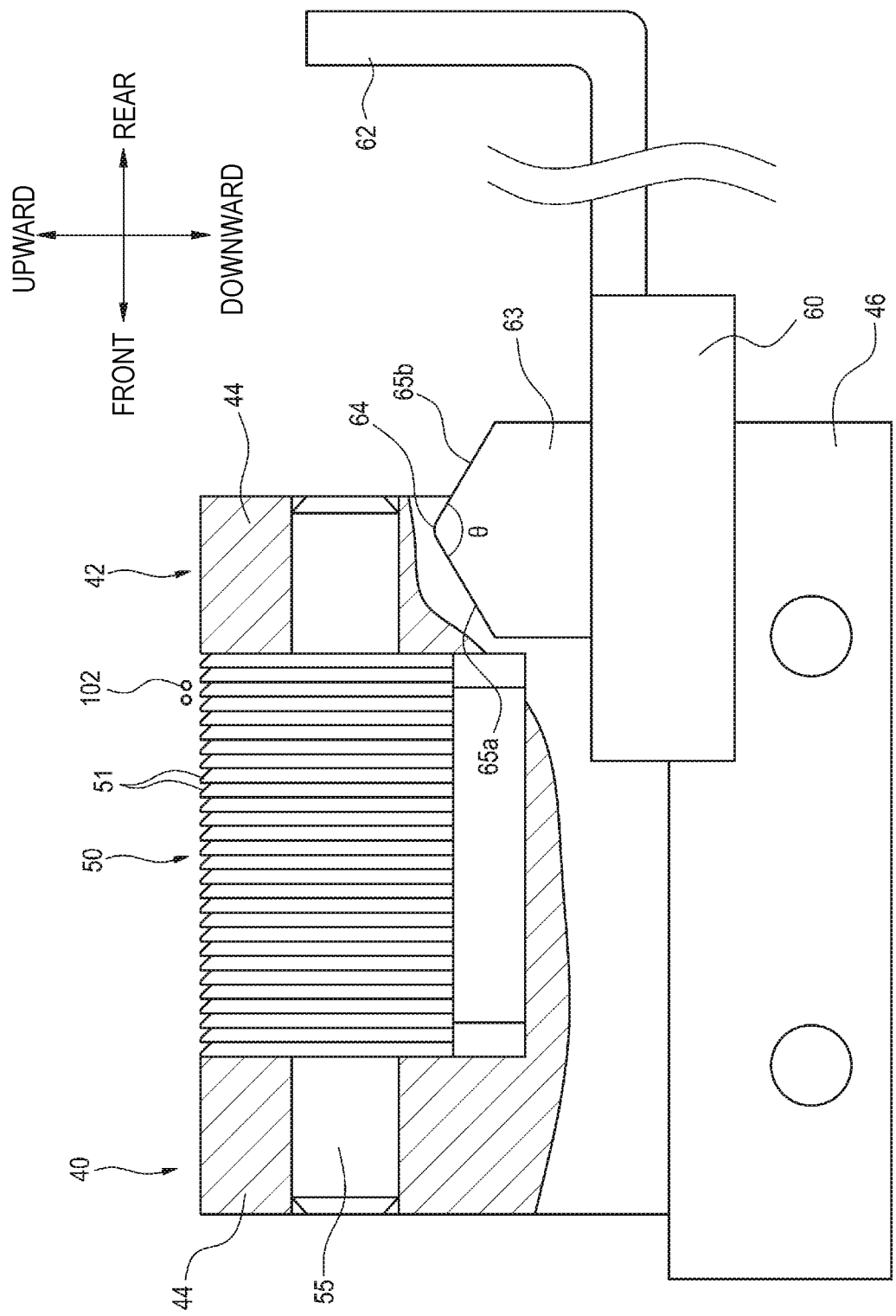
FIG. 6 is a right side view of the optical fiber alignment jig.

FIGS. 3 and 4 are perspective views of the optical fiber alignment jig 40. FIG. 5 is a front side view of the optical fiber alignment jig 40. FIG. 6 is a right side view of the optical fiber alignment jig 40.

As shown in FIGS. 3 to 6, the optical fiber alignment jig 40 includes a base 42, a fiber correcting member 50 rotatably provided with respect to the base 42, a rail 46, and a slider 60.

The base 42 is formed of a substantially rectangular parallelepiped block. A groove portion 43 cut out along a left-right direction (that is, an alignment direction of the optical fiber holder 32, the optical fiber alignment jig 40, and the V-groove member 34) is formed at the central portion of the base 42 in a front-rear direction. A pair of wall portions 44 are formed on the base 42 so as to sandwich the groove portion 43 in the front-rear direction.

A left half of the fiber correcting member 50 is accommodated in the groove portion 43 of the base 42. A right half of the fiber correcting member 50 protrudes from the groove portion 43. The fiber correcting member 50 includes a plurality of (28 in the present embodiment) fiber correcting plates 51 (hereinafter, referred to as correcting plates 51). The plurality of correcting plates 51 each have a surface (side surface) 52 that is perpendicular to an alignment direction of the optical fibers 102 along the axial direction of the optical fibers 102. That is, the side surface 52 is a surface perpendicular to a direction in which the rail 46, which will be described later, extends. Further, each correcting plate 51 has an upper surface 53 and a lower surface 54 extending in a direction along the axial direction of the optical fibers 102. The side surfaces 52 of each correcting plate 51 are arranged in parallel along the front-rear direction, which is the alignment direction of the optical fibers 102, so as to form the fiber correcting member 50. That is, the correcting plates 51 are arranged in parallel along an extending direction of the rail 46 such that the side surface 52 of a correcting plate 51 faces the side surface 52 of an adjacent correcting plate 51. A parallel pitch of the correcting plates 51 in the extending direction of the rail is designed to match the parallel pitch of the V-grooves 35 formed at an interval equal to an alignment pitch of the plurality of optical fibers. Specifically, the parallel pitch P (see FIG. 7) of the correcting plates 51 is, for example, 60 µm or more and 300 µm or less. An opening portion (not shown) is formed in the part of each correcting plate 51 which is accommodated in the groove portion 43, and a shaft 55 is inserted into the opening portion. Both ends of the shaft 55 inserted through the plurality of correcting plates 51 arranged in parallel are held by shaft holes 45 formed in the pair of wall portions 44 respectively. The shaft 55 is arranged closer to the optical fiber holder 32 than the V-grooves 35.

Figure 7:
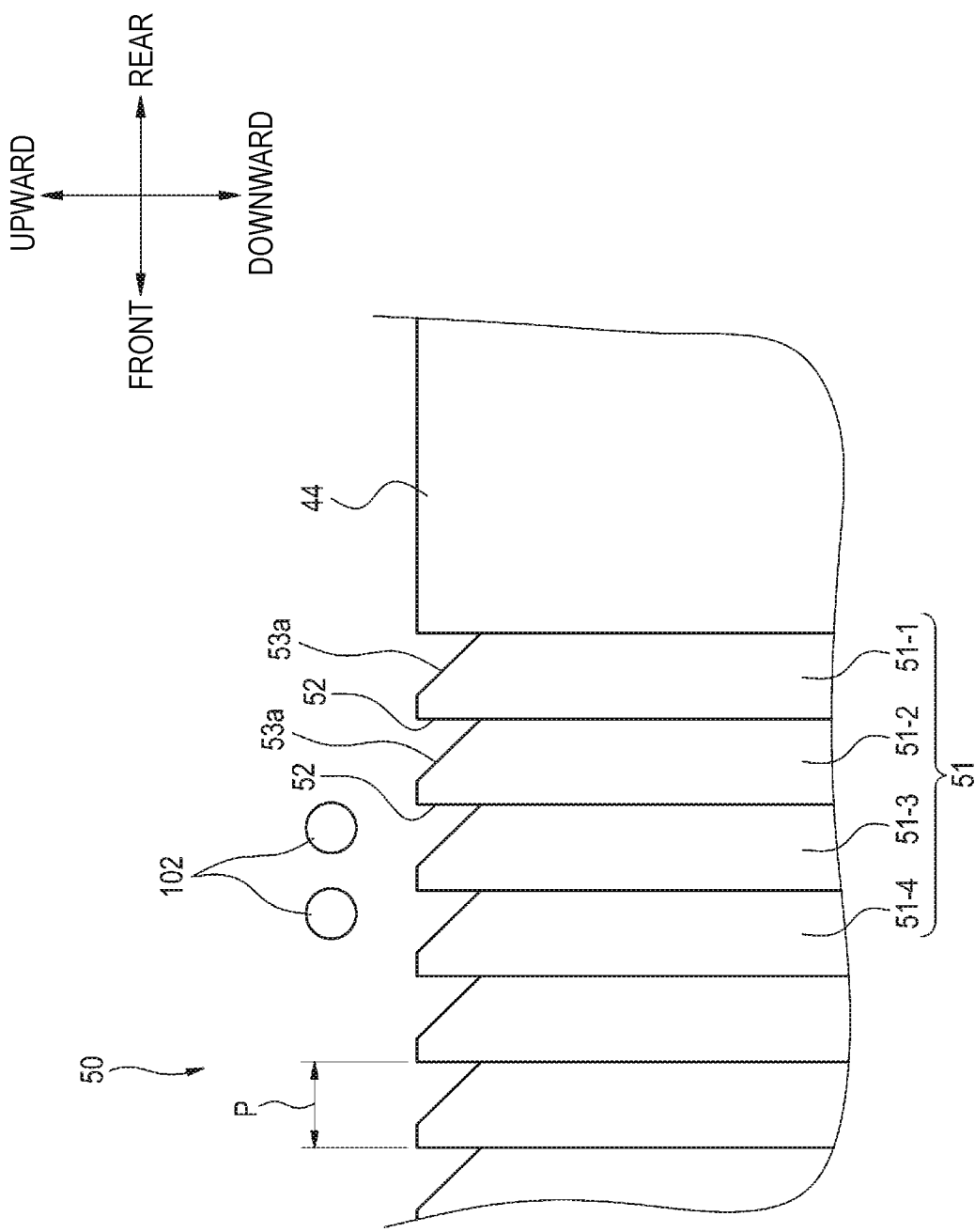
FIG. 7 is an enlarged view of a fiber correcting plate included in the optical fiber alignment jig.

The correcting plates 51 are configured to have the same shape as each other. Specifically, each correcting plate 51 is formed so as to have a substantially L shape when viewed from the direction shown in FIG. 5. That is, on the upper surface 53 of each correcting plate 51, the right half exposed from the groove portion 43 is formed with an upper step surface 53a that is one step higher than the left half accommodated in the groove portion 43. A plurality of optical fibers 102 may be placed on the upper step surfaces 53a. As shown in FIG. 7, the upper step surfaces 53a of the respective correcting plates 51 are formed to be inclined surfaces that are inclined in the same direction with respect to the alignment direction of the optical fibers 102 (front-rear direction), that is, in the same direction with respect to the extending direction of the rail 46. In the present embodiment, each upper step surface 53a is inclined so that a rear end side is located below a front end side.

The number of the plurality of correcting plates 51 included in the fiber correcting member 50 is preferably larger than the number of the plurality of optical fibers 102 included in the optical fiber ribbon 100a. Further, the number of the plurality of correcting plates 51 is preferably larger than the number of the plurality of V-grooves 35 formed in the V-groove member 34.

The rail 46 is arranged below the part of the fiber correcting member 50 that protrudes from the groove portion 43. The rail 46 extends in the front-rear direction, that is, along the alignment direction of the plurality of optical fibers 102 placed on the correcting plates 51, respectively.

The slider 60 is arranged between the lower surface 54 of the fiber correcting member 50 and the rail 46. The slider 60 is attached on an upper part of the rail 46. A lever 62 is provided at one end (for example, right end in FIG. 6) of the slider 60. When the operator moves the lever 62 in the front-rear direction, a ball (not shown) incorporated inside the slider 60 rolls along the rail 46, and a linear motion along the front-rear direction of the slider 60 becomes possible.

A push-up portion 63 is provided on an upper surface of the slider 60. The size of the push-up portion 63 in the front-rear direction is set so as to be able to contact the plurality of correcting plates 51 at the same time. A top 64 of the push-up portion 63 is formed so as to be a plane parallel to the axial direction of the aligned optical fibers 102 when viewed from the direction shown in FIG. 5. Further, the push-up portion 63 is formed so as to be an upward convex portion when viewed from the direction shown in FIG. 6. That is, the push-up portion 63 has two slopes 65a and 65b whose slope directions are different from each other with respect to the alignment direction of the optical fibers 102. Specifically, the slope 65a is formed so as to go diagonally upward from the front to the rear. On the contrary, the slope 65b is formed so as to go diagonally downward from the front to the rear. An angle θ formed by the slope 65a and the slope 65b is preferably, for example, 60 degrees or more and 170 degrees or less. If the angle θ is smaller than 60 degrees, the push-up portion 63 may become too acute, and each correcting plate 51 may not rotate smoothly. On the other hand, if the angle θ is larger than 170 degrees, each correcting plate 51 cannot be shifted and rotated in order. Therefore, there is a possibility that the plurality of correcting plates 51 are rotated at one time, and the positions of the optical fibers 102 cannot be corrected one by one. The push-up portion 63 configured in this way can come into contact with each of the lower surfaces 54 of the plurality of correcting plates 51 in order as the slider 60 moves in the front-rear direction along the rail 46.

Next, a method for aligning the plurality of optical fibers 102 exposed from the optical fiber ribbon 100a by using the optical fiber alignment jig 40 will be described with reference to FIGS. 6 to 10. In FIG. 6 and the like, for simplification of the drawings and description, only two optical fibers 102 among the plurality of optical fibers 102 exposed from the optical fiber ribbon 100a are shown. It is assumed that the two optical fibers 102 are placed on a third correcting plate 51-3 and a fourth correcting plate 51-4 from the rear of the fiber correcting member 50, for example (see FIG. 7).

Figure 8:
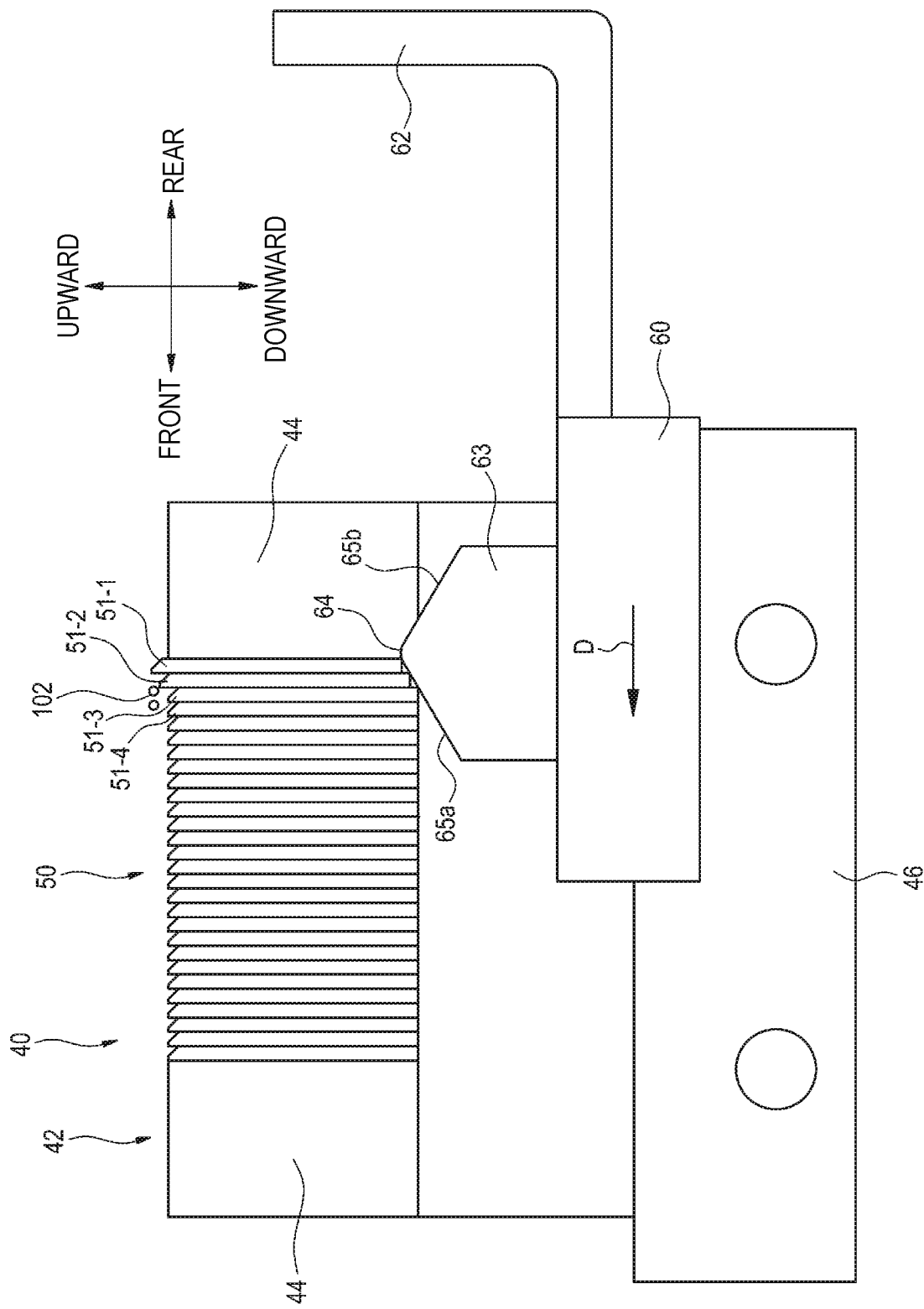
FIG. 8 is a right side view showing a state in which a slider included in the optical fiber alignment jig is moved forward.

The operator first holds the optical fiber ribbon 100a in the optical fiber holder 32, and then pushes the lever 62 connected to the slider 60 of the optical fiber alignment jig 40 forward (D direction in FIG. 8), so as to move the slider 60 from the position shown in FIG. 6 to the position shown in FIG. 8. Therefore, as shown in FIG. 8, a part of the slope 65a on the front of the push-up portion 63 which is provided on the upper surface of the slider 60 comes into contact with the lower surface 54 of each correcting plate 51 in order from the rearmost correcting plate 51-1 among the plurality of correcting plates 51. The slope 65a of the push-up portion 63 first comes into contact with the lower surface 54 of the first correcting plate 51-1 from the rear. As described above, each correcting plate 51 is provided to be rotatable around the shaft 55 with respect to the base 42. Therefore, when the slope 65a comes into contact with the correcting plate 51-1, a portion of the correcting plate 51-1 at the upper step surface 53a side is pushed upward. Subsequently, the slope 65a of the push-up portion 63 comes into contact with a second correcting plate 51-2 from the rear, and a portion of the correcting plate 51-2 at the upper step surface 53a side is pushed upward.

Figure 9:
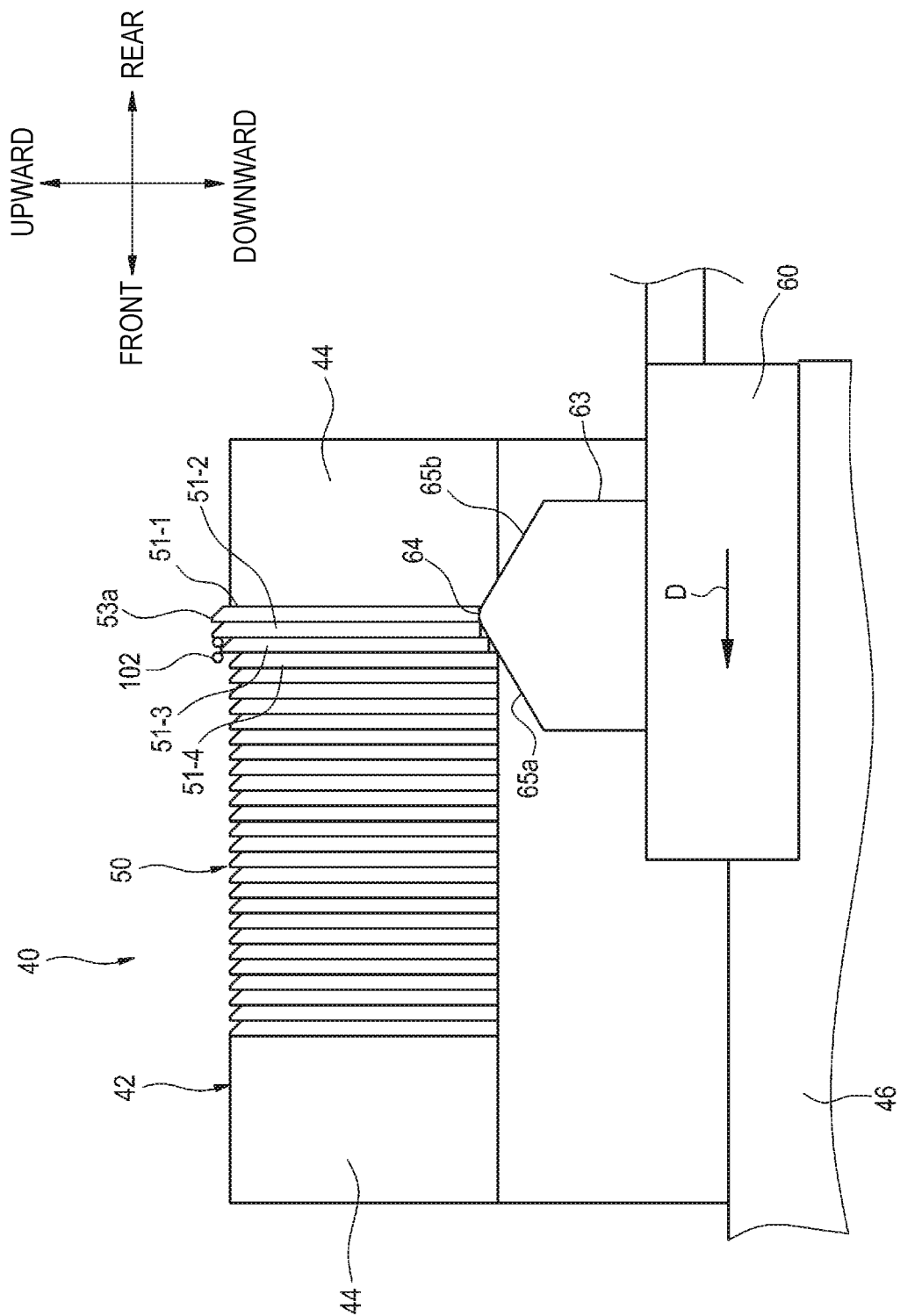
FIG. 9 is a right side view showing a state in which the slider is further moved forward.

Next, as shown in FIG. 9, when the operator pushes the slider 60 further forward (in the D direction), the slope 65a of the push-up portion 63 comes into contact with the third correcting plate 51-3 from the rear, following the first correcting plate 51-1 and the second correcting plate 51-2 from the rear. As a result, a portion of the correcting plate 51-3 at the upper step surface 53a side is pushed upward, and the upper step surface 53a of the correcting plate 51-3 comes into contact with a first optical fiber 102. The upper step surface 53a of each correcting plate 51 is formed as the inclined surface inclined so as to be lowered rearward. Therefore, the optical fiber 102 in contact with the upper step surface 53a of the correcting plate 51-3 moves along the inclination of the upper step surface 53a. Then, the optical fiber 102 is held at a position where the optical fiber 102 is in contact with the upper step surface 53a of the correcting plate 51-3 and the side surface 52 of the correcting plate 51-2 adjacent to the correcting plate 51-3 (see FIG. 7).

Figure 10:
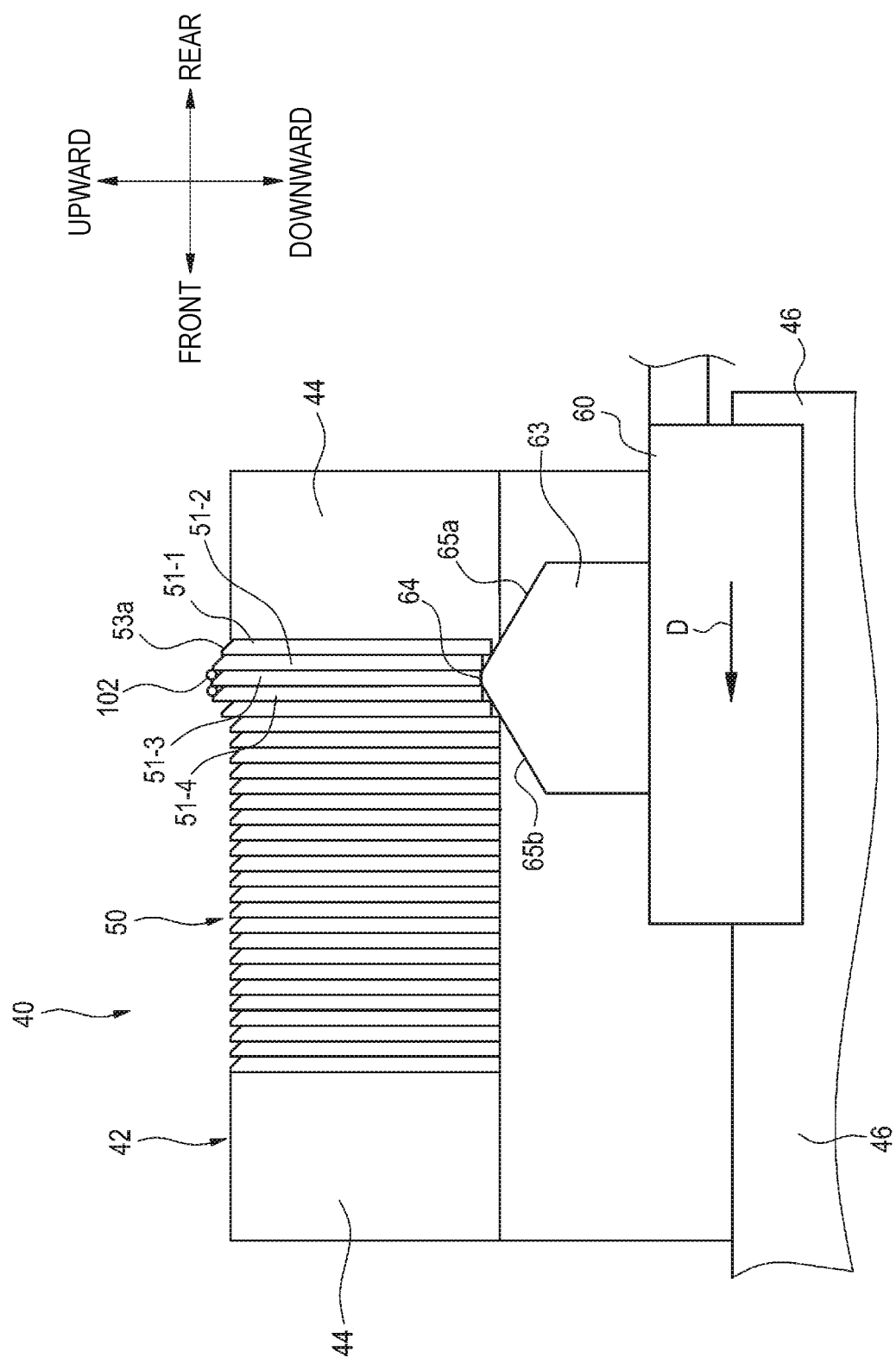
FIG. 10 is a right side view showing a state in which the slider is further moved forward.

Next, as shown in FIG. 10, when the operator pushes the slider 60 further forward (in the D direction), the slope 65a of the push-up portion 63 comes into contact with the fourth correcting plate 51-4 from the rear, following the first correcting plate 51-1, the second correcting plate 51-2, and the third correcting plate 51-3 from the rear. As a result, the correcting plate 51-4 is pushed upward, and the upper step surface 53a of the correcting plate 51-4 comes into contact with a second optical fiber 102. Similar to the first optical fiber 102, the second optical fiber 102 in contact with the upper step surface 53a of the correcting plate 51-4 moves along the inclination of the upper step surface 53a, and is held at a position where the second optical fiber 102 is in contact with the upper step surface 53a of the correcting plate 51-4 and the side surface 52 of the correcting plate 51-3 adjacent to the correcting plate 51-4. As a result, the holding position of the first optical fiber 102 and the holding position of the second optical fiber 102 coincide with the parallel pitch P of the correcting plate 51-3 and the correcting plate 51-4 (see FIG. 7).

When the lower surface 54 of each correcting plate 51 crosses the top 64 of the push-up portion 63 due to the forward movement of the slider 60, the correcting plates 51 move downward along the slope 65b due to their own weight as the correcting plates 51-1, 51-2 shown in FIG. 10. As a result, the glass fiber 103 exposed at a tip end portion of each optical fiber 102 after alignment also moves downward due to its own weight, and the glass fiber 103 is accommodated in a predetermined V-groove 35. In this way, when the push-up portion 63 comes into contact with the lower surface 54 of each correcting plate 51, the plurality of correcting plates 51 arranged in parallel are moved up and down one by one. Accordingly, each optical fiber 102 is aligned at a predetermined position, and the glass fiber 103 is accommodated in the V-groove 35.

As described above, the optical fiber alignment jig 40 according to the present embodiment includes: the plurality of correcting plates 51 (example of a plurality of plate-shaped members) arranged in parallel along the alignment direction of the optical fibers 102 and each having the side surface 52 which is perpendicular to the alignment direction along the axial direction of the plurality of optical fibers 102 exposed from the optical fiber ribbon 100a; the rail 46 extending along the alignment direction of the optical fibers 102; and the push-up portion 63 formed as the convex portion. In response to the push-up portion 63 coming into contact with the lower surface 54 (lower portion) of each correcting plate 51, each correcting plate 51 is individually rotated around the shaft 55 along the alignment direction of the optical fibers 102. The upper surfaces 53 of the respective correcting plates 51 are formed to be the inclined surfaces (upper step surfaces) 53a inclined in the same direction with respect to the alignment direction of the optical fibers 102. The plurality of optical fibers 102 can be placed on the inclined surfaces 53a, respectively. In other words, the optical fiber alignment jig 40 according to the present embodiment includes: the rail 46; the convex push-up portion 63 movable along the direction in which the rail 46 extends (front-rear direction); and the plurality of plate-shaped members 51 each including the side surface 52 (example of the first surface and the second surface) perpendicular to the extending direction of the rail 46, and the inclined surface 53a on which each of the plurality of optical fibers 102 is placed, the inclined surfaces of the plurality of plate-shaped members being inclined in the same direction with respect to the extending direction of the rail 46. The plurality of plate-shaped members 51 are arranged in parallel along the rail 46 such that the side surface 52 (example of the first surface) of one plate-shaped member 51 among the plurality of plate-shaped members faces the side surface 52 (example of the second surface) of an adjacent plate-shaped member 51, and are configured to move toward the inclined surface 53a side when come into contact with the push-up portion 63. According to such a configuration, the plurality of correcting plates 51 can be moved up and down in order by the contact with the push-up portion 63. That is, each of the plurality of correcting plates 51 is shifted and moved up and down in order together with the front and rear correcting plates 51, so that the positions of the optical fibers 102 placed on the inclined surfaces 53a of the upper portions of respective correcting plates 51 can be corrected one by one. As a result, the plurality of optical fibers 102 can be appropriately aligned.

Further, according to the present embodiment, the correcting plates 51 are configured to have the same shape as each other. Accordingly, the production of the optical fiber alignment jig 40, particularly the fiber correcting member 50 can be facilitated.

Further, according to the present embodiment, the number of correcting plates 51 constituting the fiber correcting member 50 is larger than the number of optical fibers 102 to be aligned. Accordingly, a case where a part of the plurality of optical fibers 102 exposed from the optical fiber ribbons 100a, 100b is displaced from the position where the correcting plates 51 of the optical fiber alignment jig 40 are arranged can be prevented. Therefore, the plurality of optical fibers 102 can be reliably aligned.

Further, according to the present embodiment, the parallel pitch P of the plurality of correcting plates 51 is equal to the alignment pitch of the plurality of optical fibers 102 (that is, the parallel pitch of V-grooves 35). Accordingly, the optical fibers 102 can be reliably accommodated in the V-grooves 35 respectively.

Further, according to the present embodiment, the push-up portion 63 includes the top 64 parallel to the axial direction of the optical fibers 102, and two slopes 65a, 65b whose slope directions are different from each other with respect to the alignment direction of the optical fibers 102 (the extending direction of the rail 46). Accordingly, the slider 60 is moved back and forth, so that each of the plurality of correcting plates 51 arranged in parallel along the alignment direction of the optical fibers 102 can be shifted and moved up and down in order together with the front and rear correcting plates 51.

Further, according to the present embodiment, the rotation shaft 55 of the plurality of correcting plates 51 is located closer to the optical fiber holder 32 than the V-groove 35. Accordingly, a plurality of optical fibers 102 can be held and aligned on the upper step surfaces 53a of the correcting plates 51 arranged on the side closer to the V-groove 35. Therefore, each of the aligned optical fibers 102 can be appropriately accommodated in the V-groove 35.

Although the present disclosure is described in detail with reference to a particular embodiment, it is apparent to those skilled in the art that various changes and modifications can be made without departing from the spirit and scope of the present disclosure. The numbers, positions, shapes or the like of components described above are not limited to the above embodiment, and can be changed to suitable numbers, positions, shapes or the like during carrying out the present disclosure.

In the above embodiment, a plurality of correcting plates 51 are rotated around the shaft 55 so that the optical fibers 102 can be placed on the upper step surfaces 53a of respective correcting plates 51, but the present disclosure is not limited thereto. For example, a plurality of correcting plates may be configured to be vertically movable in parallel by a linear guide or the like, and each correcting plate is moved upward by contacting the push-up portion 63 with the lower portion of the correcting plate. According to such a configuration, the optical fibers can also be appropriately aligned.

REFERENCE SIGNS LIST

10 optical fiber fusion splicer
12 fusion processing unit
14 opening and closing cover
16 monitor
18 operation unit
20 reinforcing device
32 optical fiber holder
34 V-groove member
35 V-groove
36 opening portion
37 electrode holding portion
40 optical fiber alignment jig
42 base
43 groove portion
44 wall portion
45 shaft hole
46 rail
50 fiber correcting member
51 correcting plate
52 side surface (example of first surface and second surface)
53 upper surface
53a upper step surface (inclined surface)
54 lower surface
55 shaft
60 slider
62 lever
63 push-up portion
64 top
65a, 65b slope
100a, 100b optical fiber ribbon
102 optical fiber
103 glass fiber

The invention claimed is:

1. An optical fiber alignment jig for aligning a plurality of optical fibers tip end coating of which is stripped off to expose glass fibers comprising:
 a rail;
 a convex push-up portion that is movable along an extending direction of the rail; and
 a plurality of plate-shaped members each having a first surface and a second surface which are perpendicular to the extending direction of the rail, and an inclined surface on which one of the plurality of optical fibers is placeable, the inclined surfaces of the plurality of plate-shaped members being inclined in the same direction with respect to the extending direction, the plurality of plate-shaped members being arranged in parallel along the extending direction such that a first surface of one plate-shaped member among the plurality of plate-shaped members faces a second surface of an adjacent plate-shaped member, and configured to move toward an inclined surface side when come into contact with the push-up portion.

2. The optical fiber alignment jig according to claim 1, wherein the plurality of plate-shaped members are individually rotated, in response to contact with the push-up portion, around a shaft extending along the extending direction.

3. The optical fiber alignment jig according to claim 1, wherein the plurality of plate-shaped members are configured to have the same shape as each other.

4. The optical fiber alignment jig according to claim 1, wherein the number of the plurality of plate-shaped members is larger than the number of the plurality of optical fibers.

5. The optical fiber alignment jig according to claim 1, wherein a parallel pitch of the plurality of plate-shaped members in the extending direction is equal to an alignment pitch of the plurality of optical fibers.

6. The optical fiber alignment jig according to claim 5, wherein the parallel pitch of the plurality of plate-shaped members is 60 µm or more and 300 µm or less.

7. The optical fiber alignment jig according to claim 1, wherein the push-up portion includes:
 a top portion parallel to an axial direction of the plurality of optical fibers; and
 two slopes having different slope directions with respect to the extending direction.

8. The optical fiber alignment jig according to claim 7, wherein an angle formed by the two slopes is 60 degrees or more and 170 degrees or less.

9. An optical fiber fusion splicer comprising:
 the optical fiber alignment jig according to claim 1;
 a holder placing portion on which an optical fiber holder that holds the plurality of optical fibers by sandwiching the plurality of optical fibers along an axial direction is placed;
 a V-groove on which the glass fibers are individually placable;
 another V-groove on which other glass fibers different from the plurality of optical fibers are placable; and
 a pair of discharge electrodes facing each other,
 wherein the other V-groove, the V-groove, the optical fiber alignment jig, and the holder placing portion are located in this order along a direction intersecting the extending direction of the rail, and
 wherein the pair of discharge electrodes are configured to discharge between the V-groove and the other V-groove.

10. The optical fiber fusion splicer according to claim 9, wherein the plurality of plate-shaped members are individually rotated, in response to contact with the push-up portion, around a shaft extending along the extending direction of the rail, and
 wherein the shaft is located closer to the optical fiber holder than the V-groove.

11. A method for aligning optical fibers using the optical fiber alignment jig according to claim 1, the method comprising:
   moving the push-up portion along the rail;
   bringing the push-up portion into contact with the plurality of plate-shaped members in order;
   in response to contact with the push-up portion, moving at least one of the plurality of plate-shaped members toward the inclined surface side; and
   placing the plurality of optical fibers on the inclined surfaces of the plurality of plate-shaped members, respectively.

* * * * *